March 5, 1957

G. SCHNEIDER 2,784,038

MEANS FOR PNEUMATICALLY CONVEYING
PLASTIC PARTICULATE MATERIAL

Filed Jan. 11, 1956

MEAN
AIRSTREAM
VELOCITY

MEAN
AIRSTREAM
VELOCITY

INVENTOR.
GEORGE SCHNEIDER
BY Evans & Pearne

ATTORNEYS

United States Patent Office 2,784,038
Patented Mar. 5, 1957

2,784,038

MEANS FOR PNEUMATICALLY CONVEYING PLASTIC PARTICULATE MATERIAL

George Schneider, University Heights, Ohio, assignor to Dracco Corporation, Cleveland, Ohio, a corporation of Ohio Application January 11, 1956. Serial No. 558,435

2 Claims. (Cl. 302—64)

This invention relates to the art of material handling and particularly to a means for pneumatically conveying polyethylene and similar particulate matter which tends to skin or smear on the surface of conduits through which it is moved.

Low pressure pneumatic conveyors provide economical and adaptable means for local movement of particulate goods in bulk. With the recent rapid multiplication of polyethylene applications and the constantly expanding use of this material, it has become increasingly desirable to handle polyethylene by the economical and adaptable means of pneumatic conveyors. However, up to the present time, this has not been economical in many applications because of the tendency of the particulate polyethylene to form occasional skins or smears on the sidewalls of the conduit of a pneumatic conveyor. Such skins or smears form and peel off and foul subsequent molding, injecting, extruding and similar forming operations. At the same time, painstaking separation of such skins or smears from the bulk material is impractical, except by expensive air separation processes.

In attempts to avoid this skinning effect, smooth and polished surfaces have been provided on conduit interiors; various conduit coatings have also been contemplated; and various sizes of conduits and conditions of pressures and velocities have been studied, all without success.

For these reasons, it is desirable to prevent skinning of materials such as polyethylene which have the property of depositing and building up, that is, skinning.

I have discovered that the skinning effect referred to above can be avoided by a means which apparently involves a braking action due to boundary layer effects at the conduit surface coupled with an arrangement whereby continuous contact of polyethylene particles (or particles of other materials which have a tendency to skin) with conduit surfaces is at all times avoided.

I have illustrated my invention in several aspects and by way of example in the accompanying schematic drawings in which:

Figure 1 schematically illustrates a low-pressure pneumatic conveying installation in which the invention may be employed.

Figure 1:
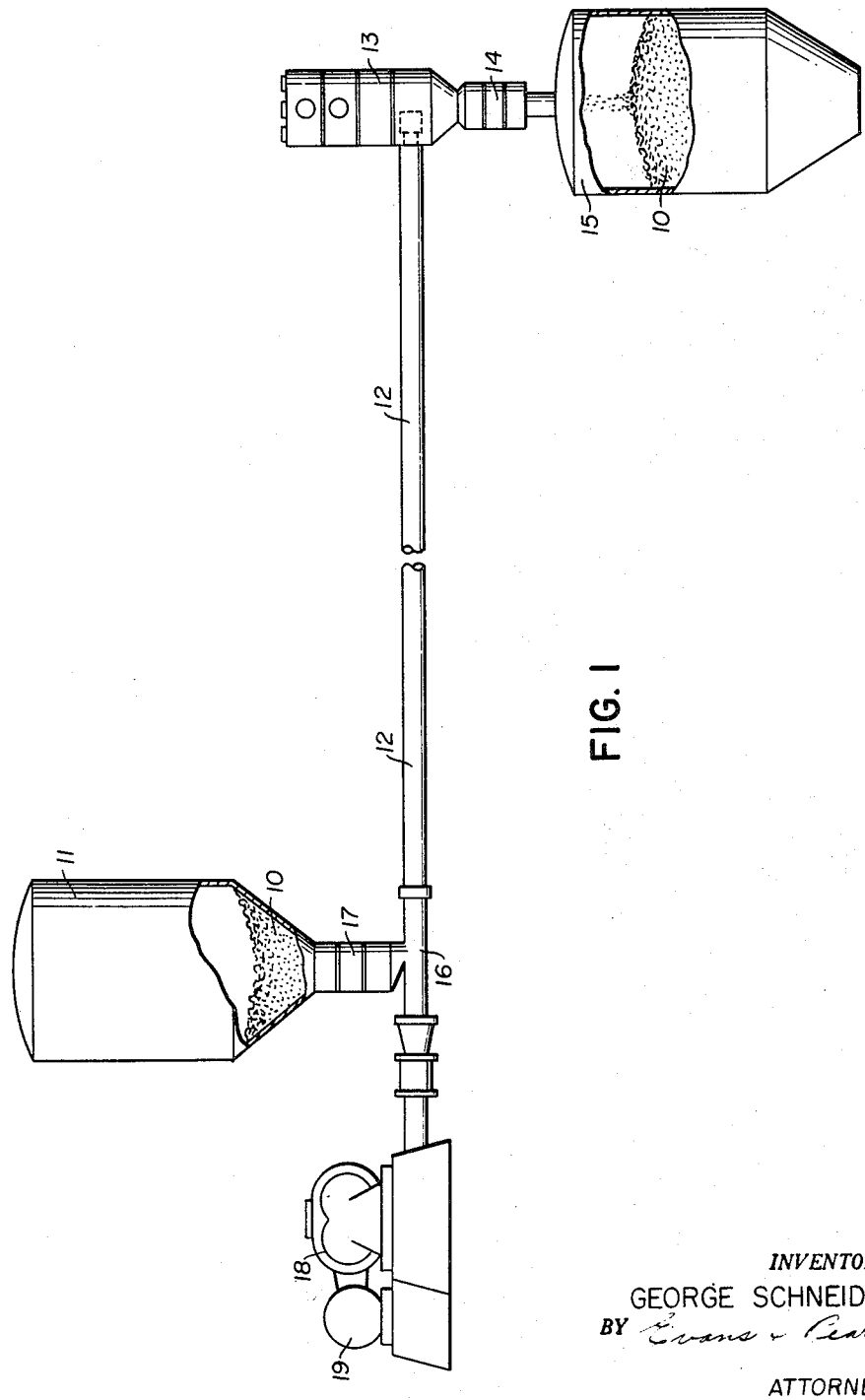

Shown in Figure 1 is a low-pressure pneumatic conveying installation in which particulate material 10 from a bin 11 is conveyed through a conduit 12 to a receiver 13 from which it is released through a discharge lock 14 to a bin 15. The particulate material 10 enters the conveyor proper through an injector 16 to which it is fed by a feeder 17. The injector 16 is supplied with conveying air by a positive displacement blower 18 powered by a motor 19. While the system shown in Figure 1 is of the pressure type, the invention is equally applicable to pneumatic conveyors of the suction type. The conveyors of the types just referred to and to which the invention relates are of the so-called low-pressure type wherein the pressure differential through the conveyor conduit is in the order of from several inches of water up to 20 or 30 p. s. i., conduit size is from about 1 to 12 or 16 inches, the material moves at from about 3,000 to 9,000 feet per minute, and the weight ratio of air to material may vary from about .1 to about 3.0, all these factors depending on the particular circumstances of the installation, all as will be obvious to those familiar with pneumatic conveyors.

Figure 2:
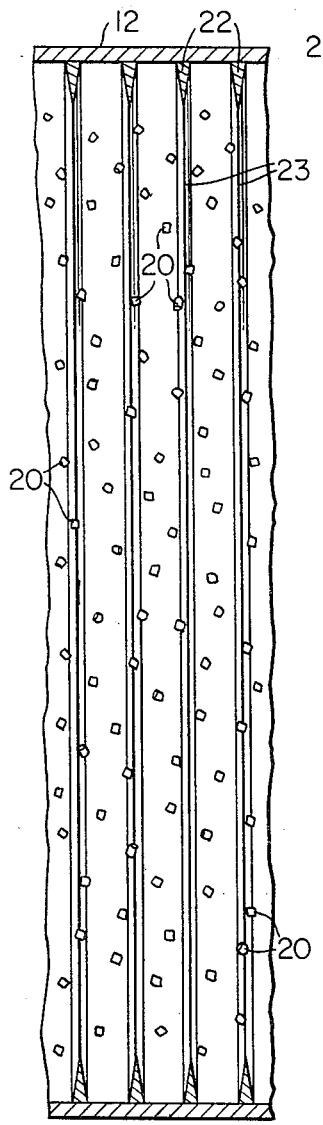
Figure 2 is a representative fragmentary side elevation in cross-section and on an enlarged scale of a conveying conduit which embodies the practice of the invention.

According to the present invention, there is maintained an abruptly descending velocity gradient in the annular zone between the sidewalls of the conduit and the main body of the airstream which is flowing through the conduit, and the sidewalls are baffled by means which interfere with continuous sliding surface contact of the conveyed material with the sidewalls. Thus, as shown in Figure 2, the conduit 12, through which particles 20 of polyethylene or other material having a tendency to skin are being carried by an airstream, is provided with relatively closely spaced annular rings 22, which preferably have radially inwardly tapered ribs 23. The mean velocity of the airstream at various points across the diameter of the conduit shown in Figure 2 is indicated graphically by the curve in Figure 3. The velocity of the airstream is substantially constant across the main body of the airstream, but at radial outer locations the drag effect of the members 22 causes an abruptly descending velocity gradient 24 to be maintained. At occasional locations, such as the point 25, the airstream velocity may actually be negative due to turbulence induced by the members 22. With reference to the general direction of flow through the conduit, it will be seen that each member 22 interferes with direct impingement of the particles 20 with the portion of the conduit sidewalls immediately succeeding such member 22.

Figure 3:
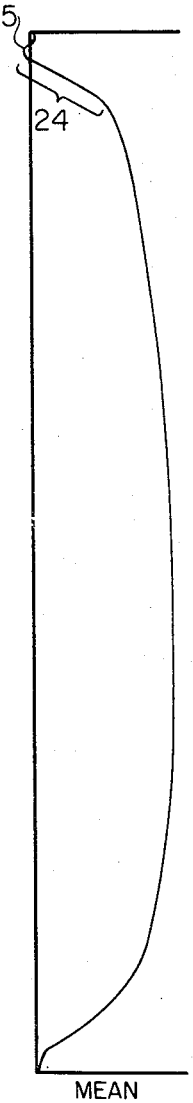
Figure 3 is a graphic representation of mean velocity gradient across the diameter of the section of conduit shown in Figure 2.

The momentum of the particles 20 is greater than that of the airstream in which they move, so that their velocity curve does not necessarily follow the airstream velocity curve shown in Figure 3. Nevertheless, lateral movement of the particles is relatively slow compared to their forward velocity, and there is therefore ample opportunity for the descending velocity gradient 24 to have a pronounced decelerating effect on a particle 20 as it moves laterally outwardly from the main body of the airstream. The particles are therefore substantially slowed before any contact with the conduit structure occurs.

The practice of the invention as outlined above completely eliminates smearing or skinning of the conveyed material and makes it feasible to handle polyethylene by the economical and adaptable means of pneumatic conveyors.

Figure 4:
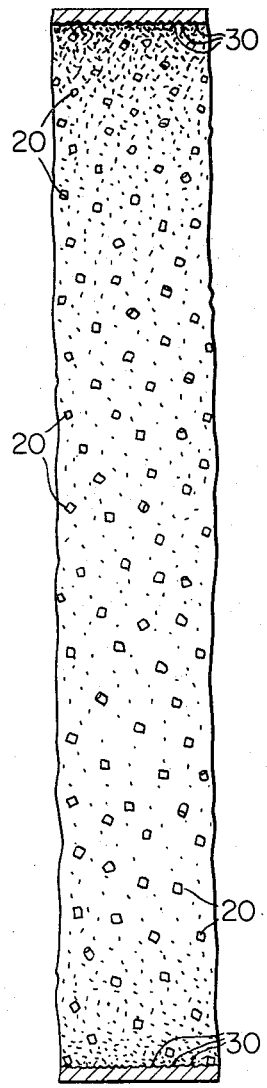
Figure 4 is a representative fragmentary side elevation in cross-section of another conveying conduit which may be used according to the invention.
Figure 5:
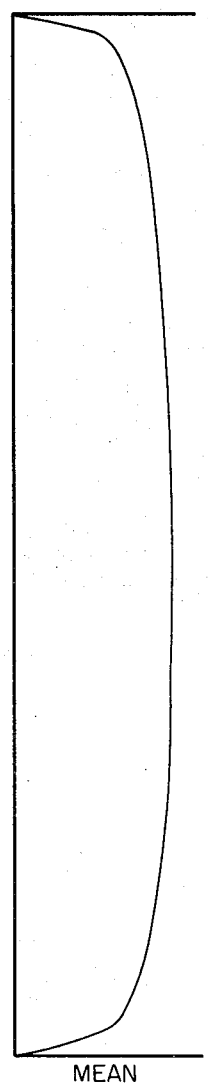
Figure 5 is a view similar to Figure 3 and bearing the same relationship to Figure 4 that Figure 3 does to Figure 2.

These advantageous results can also be obtained with the arrangement shown in Figure 4. Here the conduit surface is roughened, as by sandblasting, etching or anodizing, to a sandy finish comprising innumerable small peaks or rugae 30 and resulting in diminution of the thickness of the boundary layer or zone of abrupt velocity gradient, as compared with the embodiment shown in Figure 2. Such diminution is compensated by the synergistic effect of the many closely packed peaks 30, providing a velocity gradient which may be steeper than that of the embodiment shown in Figure 2, other conditions being equal. Contact between the particles 20 and the conduit occurs only at the peaks 30, the valleys between these peaks being shielded or baffled by the peaks from contact by the particles.

While I have specifically disclosed preferred examples of the invention, it will be apparent that the details of these examples may be modified in several particulars. Accordingly, the invention is not to be limited to the precise details of the disclosure but is to be defined by the scope of the following claims:

What is claimed is:

1. In a pneumatic conveyor of the low-pressure type comprising a conduit and means to maintain flow of an airstream through said conduit and means to scatter particles of polyethylene into said airstream at the intake end of said conduit, the combination with the above means of means associated with the walls of said conduit for maintaining an abruptly descending velocity gradient between the main body of said airstream and the walls of said conduit and for interfering with continuous sliding surface contact of said particles with said sidewalls, said last named means comprising a multiplicity of rugae distributed randomly on the walls of said conduit.

2. In a pneumatic conveyor of the low-pressure type comprising a conduit and means to maintain flow of an airstream through said conduit and means to scatter particles of polyethylene or other material having the property of skinning into said airstream at the intake end of said conduit, the combination with the above means of means associated with the walls of said conduit for maintaining an abruptly descending velocity gradient between the main body of said airstream and the walls of said conduit and for interfering with continuous sliding surface contact of said particles with said sidewalls, said last named means comprising a multiplicity of rugae distributed randomly on the walls of said conduit.

References Cited in the file of this patent

FOREIGN PATENTS 629,891     Germany _____ Apr. 30, 1936